July 5, 1949.  W. KOHLHAGEN  2,474,947
WATCH BALANCE TESTING APPARATUS
AND MAGAZINE THEREFOR
Filed April 13, 1944  6 Sheets-Sheet 1
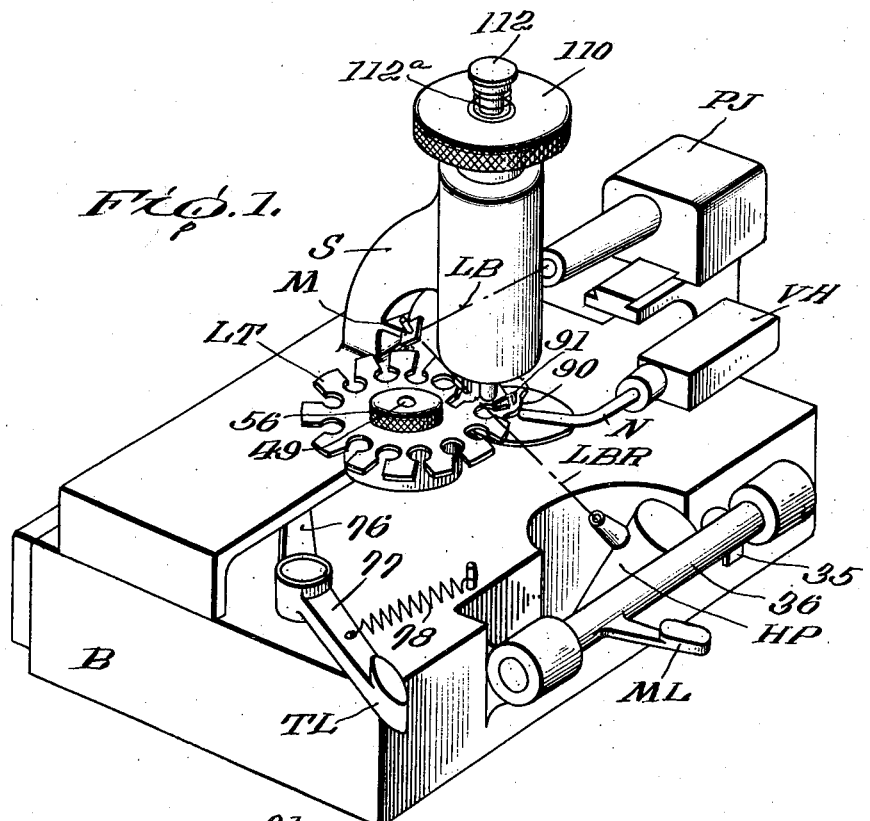
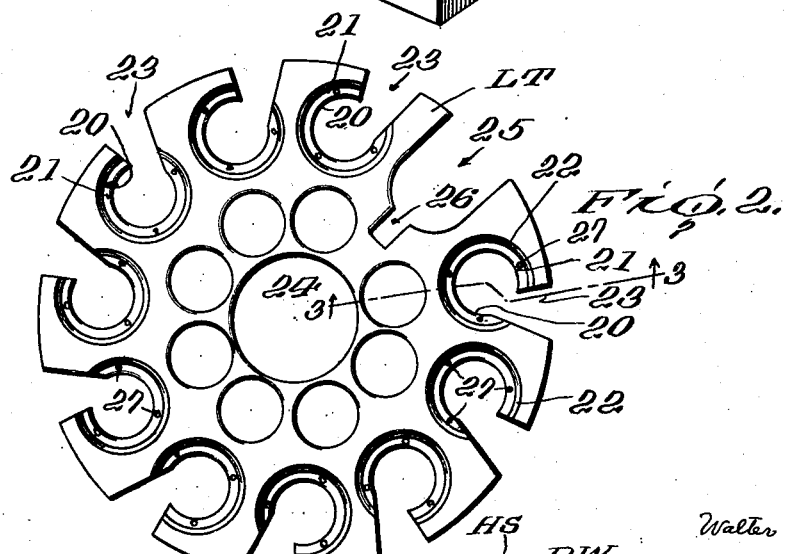
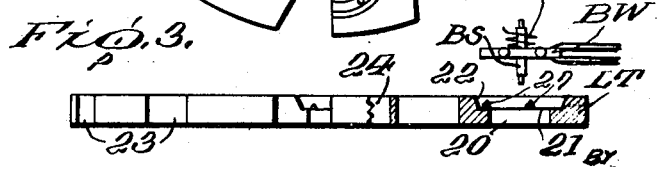
Inventor
Walter Kohlhagen,
By
Mason, Porter & Diller,
Attorneys

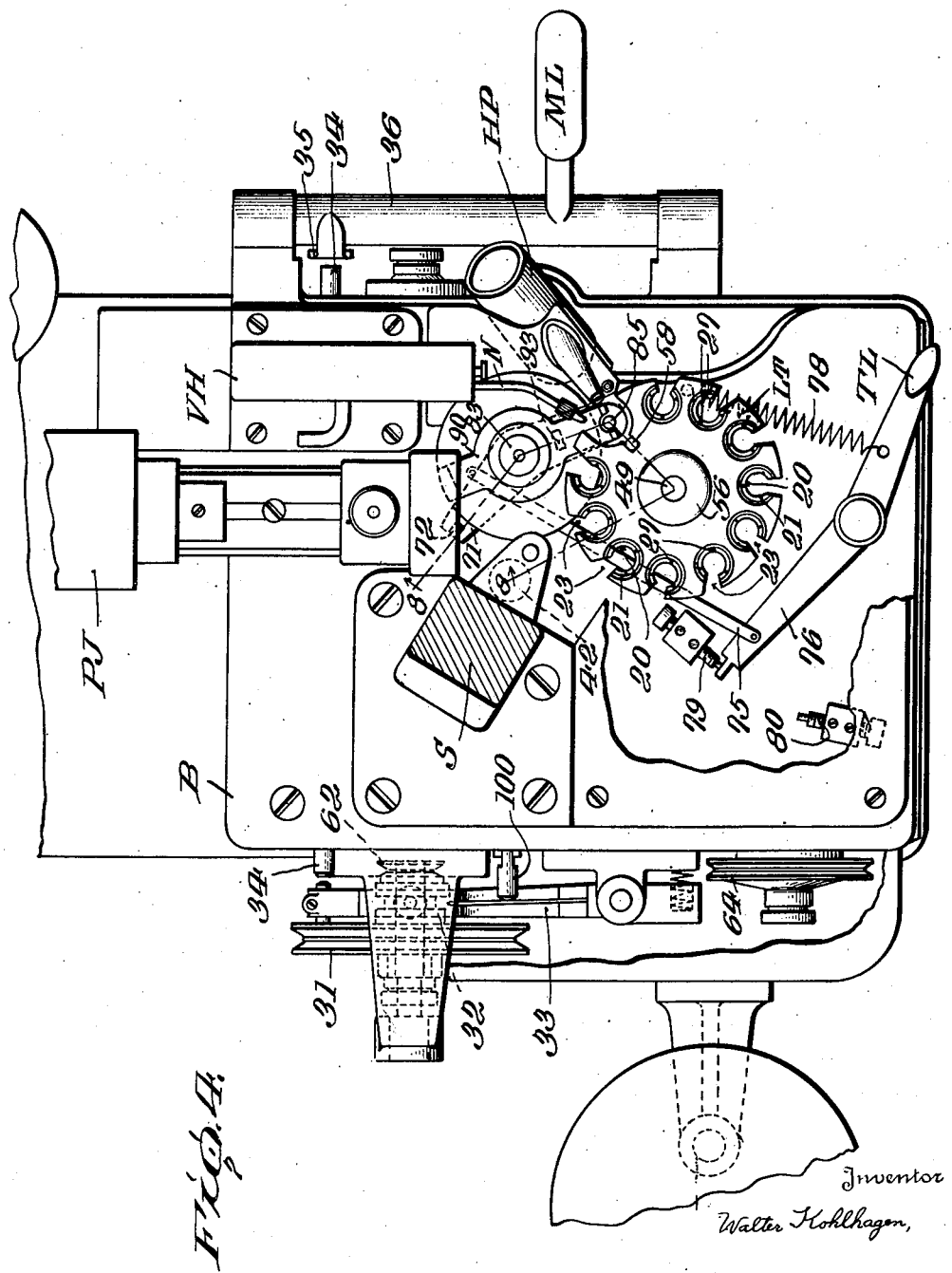

Inventor
Walter Kohlhagen,
By Mason, Porter + Diller,
Attorneys

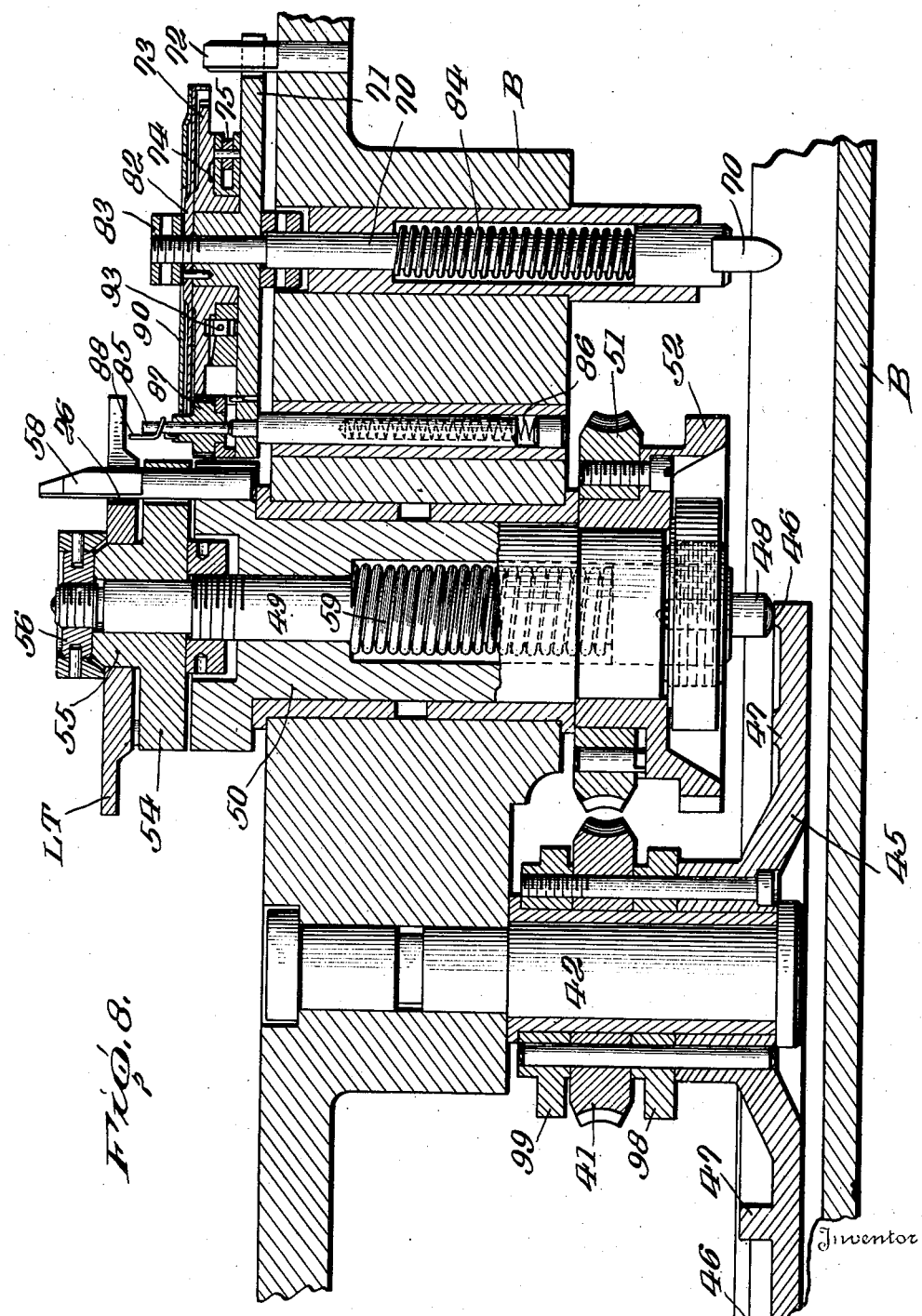

July 5, 1949.

W. KOHLHAGEN 2,474,947

WATCH BALANCE TESTING APPARATUS
AND MAGAZINE THEREFOR

Filed April 13, 1944

DELIVERING

TRAY 46

LOWER BEARING 49

INDEX PAWL 98

CLUTCH 99

RECEIVING

TESTING OR
INITIAL POSITION

Inventor
Walter Kohlhagen
By Mason, Porter & Diller,
Attorneys

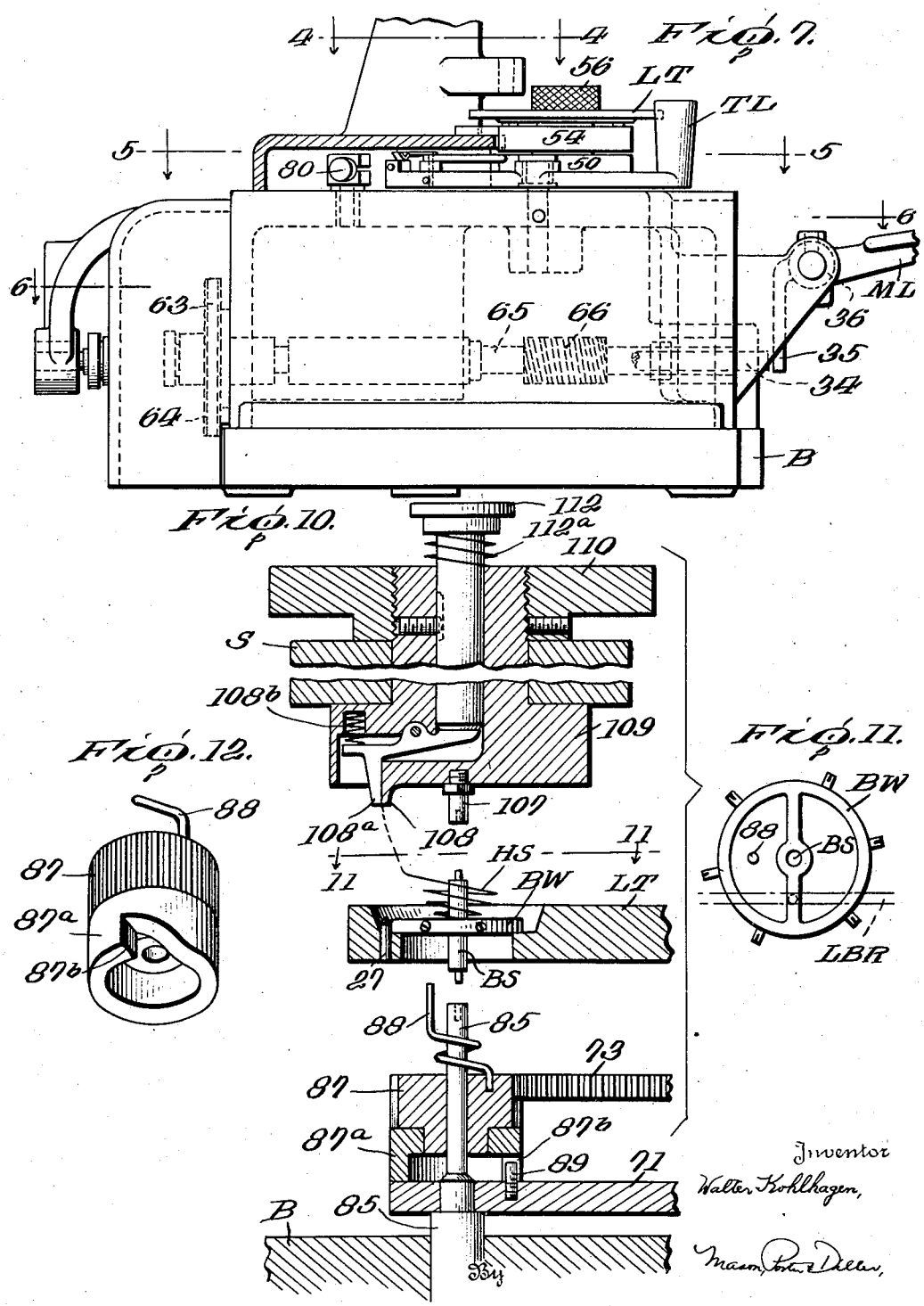

Patented July 5, 1949

2,474,947

UNITED STATES PATENT OFFICE 2,474,947

WATCH BALANCE TESTING APPARATUS AND MAGAZINE THEREFOR

Walter Kohlhagen, Elgin, Ill., assignor to Elgin National Watch Company, Elgin, Ill., a corporation of Illinois Application April 13, 1944, Serial No. 530,876

13 Claims. (Cl. 73—6)

This invention relates to improvements in apparatus for testing watch balances and like devices, where it is desirable to avoid manual contact with sensitive elements, and where it is necessary to provide for placing the elements individually into testing mechanisms, securing a test thereon, and then withdrawing the tested element and replacing it by a further element to be tested.

One of the features of the present invention is the provision of an apparatus including a rotatable tray for supporting a plurality of the devices to be tested, means for indexing the tray for successively presenting the devices for testing, and supports for holding the device during the test, together with inter-associated means for cyclically coordinating the successive movements of the parts incident to the positioning and testing.

Another feature of the invention is the provision of a tray which will receive a plurality of watch balances or like devices in peripherally spaced positions, and which can be handled as a unit from a loading operator to a testing operator for employment in the testing apparatus, and then taken from the testing apparatus as a unit.

A further feature of the invention is the provision of an apparatus having locating means for receiving a separable loading tray and effective for successively indexing the loading tray and alternating therewith motions of parts for bringing the individual devices into and from testing position.

Other features will appear in the course of the following specification and claims, taken in conjunction with the drawings which illustrate one form of practicing the invention, and comprise:

Figure 1 is a general perspective view of the testing apparatus.

Figure 2 is a plan view of a loading tray or magazine.

Figure 3 is a side elevation, with a part in diametrical sectional view, of the loading tray or magazine.

Figure 4 is a top elevation of the lower part of the apparatus structure, substantially on line 4—4 of Figure 7.

Figure 7 is a front elevation of the lower portion of the structure, showing certain internal parts in dotted lines.

Figure 8 is an unwrapped section on a larger scale, taken from axis to axis, substantially on the broken line 8—8 of Figure 4.

Figure 9 is a diagram showing the layout of certain cams.

Figure 10 is a detail view, on a large scale, showing a position of the balance wheel preliminary to testing.

Figure 11 is a corresponding view, substantially on lines 11—11 of Figure 10.

Figure 12 is a perspective view of a rotating member for the energizing drive.

Figure 5:
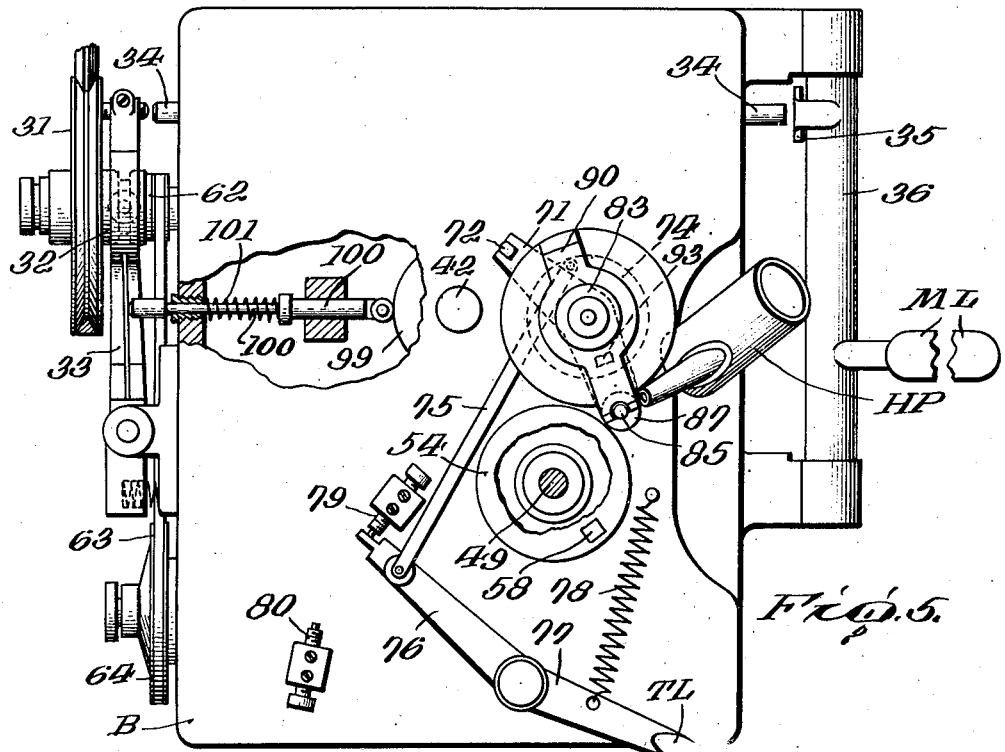
Figure 5 is a horizontal sectional view of the same substantially on line 5—5 of Figure 7.

The apparatus as indicated in the perspective view in Figure 1, comprises a base B having upstanding therefrom a support S which carries upper structures for employment during the testing and calibration of a watch balance such as a balance and hair spring assembled as a unit. The loading tray LT is positioned so that its successive loading stations come beneath the upper structure. A source of light, illustrated as a projector PJ, is positioned at the rear of the base B and projects a light beam LB against a mirror M mounted on the support S, so that the reflected ray LBR passes through the balance and hair spring unit which has been positioned by the loading tray LT for testing, and enters the housing HP containing a photoelectric cell responsive to changes in the illumination produced by beam LBR, in accordance with the action of the watch movement which is being tested. A valve housing VH has a nozzle N through which pulses of air may be directed at the proper instant of phase, and at the necessary condition of diminished amplitude of motion, for maintaining the watch balance in oscillation, for example, as set out in my co-pending application, Serial No. 443,997, filed May 21, 1942, which matured into Patent Number 2,354,954 on August 1, 1944.

A first hand lever ML serves when actuated to effect a withdrawal of one balance and hair spring unit from testing position, with an indexing of the loading tray LT and the delivery of another balance and hair spring unit into testing position.

A second hand lever TL is employed for storing energy in the unit assembly and releasing the same for its testing movement, and is likewise effective for initiating the operation of testing, as set out in my aforesaid co-pending application and also in my application, Serial No. 439,128, filed April 15, 1942, which matured into Patent Number 2,358,078 on September 12, 1944.

The loading tray LT (Figs. 2 and 3) is circular in form, and is provided with a plurality of loading stations or pockets which are each adapted to receive and accurately position a watch balance. For this purpose, a large aperture 20 receives the downwardly projecting staff of the balance, and the balance wheel is seated on a shoulder 21 provided by an enlargement of this aperture. Above the shoulder 21 extends a wall which terminates in an outwardly directed beveled surface 22 serving for guiding the balance wheel into its proper position. It will be understood that the balance wheels may be provided with adjusting screw heads extending from their peripheries in the usual manner, and that the presence of these balancing screw heads is taken into account in determining the proper external diameter for the wall extending upwardly from shoulder 21. This wall is preferably formed as a circular arc (Fig. 2), but this arc is interrupted to provide a notch 23 extending from the periphery of the loading tray LT for the reception of tweezers employed by the operator in placing the unit assemblies in the loading tray or removing them therefrom, so that these unit assemblies may be handled individually while the tray is held in a substantially horizontal position.

At the center of the tray, it is provided with an aperture 24 which is concentric with the edge of the tray and also with the centers of the various apertures 20 provided at the successive stations.

The successive stations do not entirely fill the circumference of the loading tray LT, but a cutout or notch 25 is provided with a "loading position" at which this loading tray LT may be introduced into the machine without interference with the parts thereof. At the base or inner portion of the notch 25 is provided a narrow extension 26 of this notch for engagement with a locating means for assuring the proper angular position of the loading tray LT in the machine.

The device to be tested may be supported on the shoulder 21 and positioned for tolerable concentricity with the supports 85, 108 described hereinafter by the wall 22; but in order to assure highly accurate positioning, especially when watch balances of delicate and closely dimensioned structures are to be tested, it is preferred to provide a plurality of pins 27 on the shoulder 21 over each pocket. These pins are illustrated (Figs. 3 and 10) as tapered at their upper ends in order to engage and guide the balance wheel into position. Owing to the presence of the poising screws at the outer periphery and the spokes at the inner periphery of the form illustrated, the operator can insert and bring the successive balance wheels to proper position by use of tweezers (Fig. 3), and upon slight radial and peripheral movements, each balance is moved until it screws or spokes are clear of the pins, depending upon whether the pins are to engage the outer or inner periphery. In the illustrated form, the pins engage the outer periphery. Thus, in proper position, the rim of the balance wheel rests on the shoulder and is held accurately in concentric and coaxial relation to the axis of the pocket regardless of the position of the poising screw heads or spokes, and hence is ready for accurate presentation to the testing devices. The tops of the pins are illustrated as so far below the upper surface of the tray, i. e., below the tops of the pockets, that the balance wheel is returned into the pocket instead of assuming a position in which the wheel might be displaced across the top of the tray.

The base B is provided (Fig. 6) with a horizontal shaft 30 at its rearward portion, upon which shaft is loosely mounted for rotation a main driving pulley 31 which serves as a source of power for the mechanical operation of the apparatus. The shaft 30 also supports a clutch 32 by which the pulley 31 may be coupled to the shaft 30. This clutch is actuated by a lever 33 which in turn is moved to engaging position by a rod 34 which extends transversely in the machine for engagement by a depending arm 35 (Figs. 1, 4, 5, 6 and 7) secured to the rock shaft 36 to which the hand lever ML is connected.

The shaft 30 has a worm 40 thereon engaged with the worm wheel 41 (Figs. 6 and 8) mounted on a cam nest, as will be described hereinafter, supported on a fixed pivot shaft 42.

The cam nest comprises a face cam member 45 having two face cams 46, 47 on the upper surface thereof.

The face cam 46 engages a projection 48 of a vertically movable quill 49 guided in the base B for reciprocating the rotary motion, and carried in the sleeve 50 which itself is rotatable in the base B and carries a worm wheel 51 and a positioning disk 52. The upper end of the quill 49 carries a table 54 having an upstanding concentric column 55 with a tapered upper end. This column 55 is of a diameter to closely receive the walls of the aperture 24 in the loading tray LT and therewith accurately position the same for rotation. A securing nut 56 is threaded upon the upper end of the quill 49 and serves to maintain the loading tray LT in position. The sleeve 50 carries a locating pin 58 which extends upwardly through an aperture in the table 54 and has a beveled end of an arcuate width equivalent to the width of the notch extension 26 whereby to locate the loading tray LT accurately with respect to the positioning plate 52.

A spring 59 positioned in an annular cavity of the sleeve 50 exerts a downward effort upon the quill 49 for returning the same into its lowermost position when so permitted by the face cam 46.

The cam 46 has two humps which serve to raise the tray twice during each cycle of movement. When the cam is at rest, the tray is lowered and, if a unit assembly has been at this station of the tray, this assembly is supported above the tray, by means described hereinafter, in condition for testing. As the cam turns, the first hump (marked as the "receiving" hump on the drawing) causes the tray to raise until the top of the peripheral wall is above the bottom of the balance wheel so that the latter can be guided to its lowered position, but when the pins 27 are employed, it is preferred to have this "receiving" hump lower than the second or "delivering" hump, so that the tops of the pins are not brought into contact with the peripheral balance screws if aligned therewith. Thus no injury occurs to the assembly, such as bending or breaking of the balance pivot caused by tipping of the wheel upon contact with a pin while the pivot ends are engaged in the testing supports.

A pulley 62 fixed on the shaft 30 receives a driving belt 63 passing over the pulley 64 fixed on a front transverse shaft 65 within the base B: this belt-and-pulley drive provides for slipping, so that the shaft 65 is not compelled to turn concurrently with the shaft 30. The shaft 65 carries a worm 66 engaged with the worm wheel 51 for driving the same at times permitted by the power received from the shaft 30, and permitted by the unlocking of the positioning plate 52, as described hereinafter.

The lower support for the balance wheel of the unit assembly is moved upwardly and downwardly by the face cam 47. A pin 70 is guided for vertical movement and supports a plate 71 at its upper end (Figs. 4, 5, 8 and 10) which has a notch for receiving the guide pin 72 which prevents relative rotation. A gear 73 is mounted above the plate 71 with a driving member 74 positioned therebetween. This member rocks about the axis of the pin 70 under movement imparted by the link 75 which is connected at its other end to one arm 76 of the hand lever TL, whose other end 77 is connected to a spring 78 which is effective for normally moving the member 74 in a relative counterclockwise direction in Figure 5. The limits of rocking movement of the lever TL are established by adjustable stops 79, 80 (Figure 5). The stops 79, 80 are mounted on the base B by insulating blocks, and are electrically connected illustratively in the manner taught in my aforesaid applications for determining the operation of testing and other devices in proper unison. A shield 82 extends over the gear 73, and the assembly is secured to the plunger pin 70 by a top nut 83 so that the parts will rise and fall together in accordance with the prevailing height of the face cam 47 and is pressed downwardly by a spring 84.

A lower support pin 85 is mounted for vertical movement in the base B and has an apertured upper end for receiving the lower end of the balance assembly. A shoulder engages against the lower face of the plate 71 to limit the upward movement of the pin 85 under the urgency of a spring 86. A driven pinion 87 (Figs. 8, 10 and 12) is rotatable about the axis of the pin 85 by its meshing engagement with the gear 73, and supports a wire spring member 88 which permits resiliency relatively about the periphery of the pin 85, and has an axially extending upper end for engagement between the spokes of the balance wheel as described hereinafter.

Figure 6:
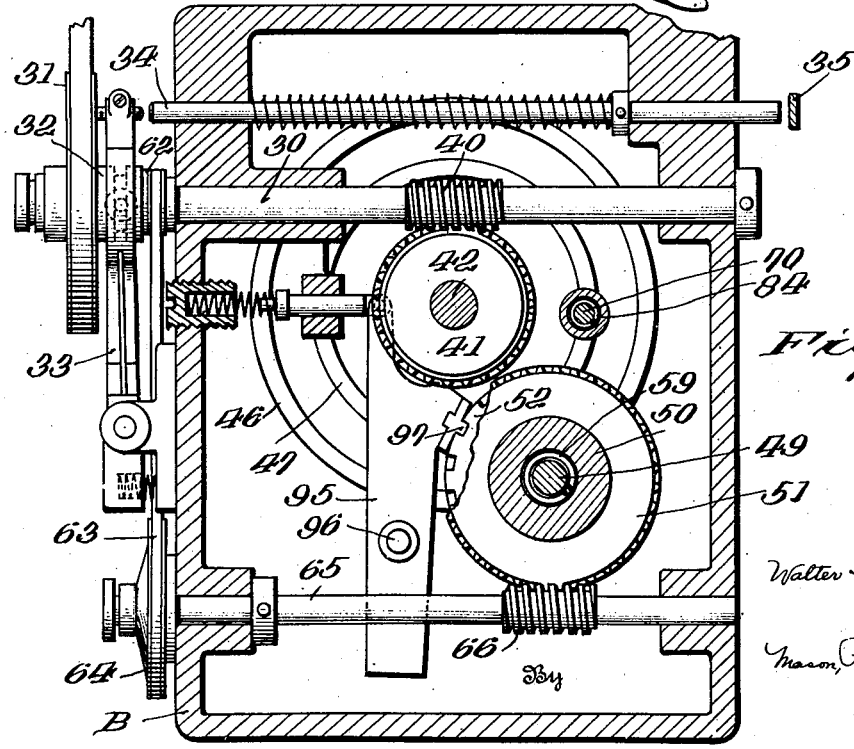
Figure 6 is a horizontal section through the same, substantially on line 6—6 of Figure 7.

As shown in Figures 6 and 12, the driven pinion 87 receives a cam-piece 87a which is fixed thereto by a press-fit; and has an edge cam at its lower surface, comprising a shoulder 87b and a slope, while the major portion of the lower edge of the cam-piece 87a is in a radial plane. A pin 89 on the plate 41 cooperates with this edge cam of the cam-piece 87a.

A support 90 is mounted at the upper end of pin 70 for carrying a stripper finger 91 effective for detaining the balance wheel, while the supporting structures are being lowered, and thereby assuring that the balance is accurately seated in its station position in the loading tray LT after the test has been accomplished.

A pawl 93 is pivoted on the friction member 74 and serves to engage in substantially radial notches in the lower face of the gear 73 when the link 75 is actuated for effecting a rotation of the gear 73.

The locating plate 52 (Fig. 6) has notches in its periphery which are peripherally spaced, corresponding to the spacing of the loading stations in the loading tray LT. A latching pawl 95 is rockable about a pivot 96 of the base B, and has a nose 97 for entering these notches successively. The pawl 95 is actuated by a cam 98 of the cam nest mounted on shaft 42 (Fig. 8) at the beginning of each cycle of indexing movement, so that the nose 97 is withdrawn from the notch it has occupied, to permit an initial indexing movement of the shaft 49 and associated structures; and thereupon the cam 98 permits this nose to come against the periphery of the locating plate 52 until it slips inward again to occupy the notch corresponding to the next station. Further, a cam 99 of this nest actuates a telescoping link including the members 100 and the intermediate spring 101 for expanding these members. This link extends into engagement with the clutch fork lever 33 and thus serves to maintain the clutch engaged substantially throughout the indexing movement, thus assuring the structure against termination of indexing movement prior to the delivery of a new station to the operating point.

It will be noted from the figures that the loading tray LT extends above the pin 85 which provides the lower support. An upper bearing 107 for the unit assembly is carried by the support S (Figs. 1, 6 and 10) in coaxial position with the lower bearing provided at the end of pin 85. A fixed gripper 108 is carried adjacent the upper bearing 108 in a rotatable sleeve 109 which can be turned in either direction by an end wheel 110. A second gripper 108a is pivotally mounted in the sleeve 109, so that it can be separated from the gripper 108 by depression of a knob 112 at the top of an upper bearing assembly, against the action of springs 108b, 112a. The precise structures for securing the relative rotation and movement of these structures form no part of the presently described invention, and therefore have not been shown in detail.

In the operation of the apparatus, a loading tray LT is supplied with its quota of unit assemblies to be tested, and for this purpose the operator can engage the individual balance wheels with tweezers and insert them upon the loading tray, held with its axis substantially vertical, by passing the tweezers through the notches 23, and placing each unit so that the balance wheel rim rests upon the bottom of the tray pocket, and the peripheral screws are positioned between the pins. These unit assemblies are inserted with the hair springs HS at the top.

The loaded tray of untested devices may be inserted into the machine by bringing the notch 25 opposite the upper and lower bearings 85, 107, and fitting the tray upon the upper column 55 on quill 49. The extension 26 of notch 25 engages the projecting pin 58 for accurately positioning the tray LT with respect to the locating plate 52. The clamping nut 56 is then engaged.

The pulley 31 receives power from any desired source, the projector lamp PJ and the circuits associated with the photoelectric cell in housing HP are energized, and air is delivered in the valve housing VH. The apparatus is now ready for accomplishing the testing of the unit assemblies on the tray LT.

The operator depresses the first hand lever ML, so that it moves the clutch actuating pin 34 toward the left (Fig. 6) and engages the clutch fork lever 33 and causes the clutch 32 to be engaged. The shaft 30 now begins to turn, and the worm 40 initiates rotation of the cam nest. The cam 46 raises the quill 49 and lifts the tray LT; then the cam 47 lowers the pin 70 (which has been in raised position during the placement of the tray LT); and finally the cam 46 lowers the quill and tray. As set out above, the "receiving" hump on cam 46 is not as high as the "delivering" hump, and hence the tray is not raised into full contact with the balance wheel; but, instead, pauses below the wheel so that the descent of the pin 70 effects deposit of the balance; and this deposit may not result in a resting of the wheel rim in the bottom of the tray pocket, as explained, but on all occasions the upper end of the balance staff is below the upper bearing 107, so that the tray and its contents are free to turn. Meanwhile cam 99 is holding the clutch 32 engaged (Fig. 9). These movements are then followed by the action of the cam 98 in moving the latching pawl 95 so that its nose 97 releases the locating plate 52. The belt 63 has meanwhile been slipping, but upon unlatching of the locating plate 52, it begins to drive the pulley 64 so that the shaft 65 turns and the worm wheel 66 causes an indexing movement of the worm wheel 50 and its connected parts. After the locating plate 52 has begun its movement, the latching pawl 95 is permitted by cam 98 to return until its nose 97 rides against the edge of the locating plate. When the locating plate has been turned through the angular distance to the next station, the nose 97 drops into the next notch and thereby brings the locating plate 52 and its connected parts to a standstill in a position at which the next station and its unit assembly is positioned with the balance staff ready for engagement by the bearings 85, 107.

The cam 46 now causes a new raising of the tray LT for effecting engagement of the upper end of the balance staff of the balance, which has been presented by the tray LT in the upper bearing 107, and shortly thereafter the cam 47 raises the lower bearing 85 so that this is brought into engagement with the lower end of the balance staff. The cam 46 now permits the tray LT to be lowered again, thus leaving the new unit assembly mounted on the bearings 85, 107.

The cam 99 releases the clutch locking pin assembly 100, 101, and the cam next comes to a standstill.

The operator now grips the end of the hair spring HS with tweezers, depresses the knob 112 to separate the grippers 108, 108a, introduces the end of the hair spring between these grippers, and then releases the knob 112 so that they now engage the end of the hair spring. This position of the parts is shown in Figure 10, with the unit assembly comprising the balance wheel BW and balance staff BS mounted in the bearings 85, 107.

The balance wheel BW (Fig. 11) in this illustrative form of practice has two diametrically opposed spokes. The position of these spokes in the apparatus is entirely random at this stage of the operation. The operator then rotates the hand wheel 110 until the light beam LBR is intersected by one of these spokes while the balance wheel BW is essentially at rest, and thereby obtains an initial positioning of the device at a neutral axis: this positioning may be observed visually, or can be supervised electrically, as taught in my said co-pending application.

The operator now pulls the hand lever TL in a clockwise direction (Fig. 4) against the action of spring 78, thereby causing the link 75 to move the rocker member 74 in a clockwise direction about the axis of pin 76, the pawl 93 slipping during this movement so that the gear 73 remains fixed. The engagement of shoulder 87b of cam-piece 87a with pin 89 prevents any movements of gear 73 or pinion 87 during this movement of the hand lever TL. The arcuate movement of the member 74 is limited by the stop 79. During this movement of the lever TL, furthermore, the electrical testing apparatus is energized and set up for service under the conditions taught in my said co-pending applications.

The operator now moves the hand lever TL back again, so that the link 75 is pulled and the member 74 and pawl 93 engage the gear 73 and cause the pinion 87 to be rotated through an angle of 360 degrees before the return movement of the lever TL is limited by the stop 80. During this movement, the cam-piece 87a engages pin 89, and is raised so that the wire pin 88 engages a spoke of the balance wheel BW and causes this balance wheel to be rocked in a counterclockwise direction (Figs. 4 and 11) through an angle of, say 330 degrees. The shoulder 87b of the cam-piece slips from the pin 89, and the wire pin 88 is now retracted so that the unit assembly is permitted to oscillate under the urgency of the hair spring HS in which energy has been stored by the aforesaid winding. As the unit assembly oscillates, the passage of the spokes across the path of the light beam LB causes successive interruptions of the light supplied into the photoelectric cell in housing HP, and the rate of the movement can be observed, as taught in my co-pending application Serial No. 439,128, filed April 15, 1942.

If it is found that the movement is too fast or too slow, the operator can bring the movement to a standstill, and release the grippers 108, 108a and move the hair spring to a new position of engagement thereby, so that the effective length of the hair spring is increased or decreased, and further observations then indicate whether the new adjustment gives synchronism with a standard. When this synchronism is attained, it is known that the unit assembly is essentially in proper time, and this position of engagement of the hair spring HS can now be marked.

The operator releases the hair spring by depressing the knob 112, and the hand lever ML is depressed to effect a new indexing movement. The cam 46 now raises the quill 49 again and lifts the tray LT until it receives the rim of the balance which has just been tested. When the guiding and locating pins 27 are employed, one or more of the poising screws may strike a pin so that the periphery of the balance wheel does not return to flatwise contact with the shoulder 21; but this is not harmful because the balance has already been tested and does not need to be returned to supports 85, 108 and the height of the pocket wall 22 above the tops of the pins assures the balance against lateral displacement during testing of the other balances and during subsequent handling of the tray and its contents. The cams 46 and 47 now act to lower the tray LT and the lower bearing 70 concurrently until the balance staff is free of the upper bearing 107. Thereafter the cam 46 holds the tray LT at the predetermined indexing level, while cam 47 continues to effect a lowering of the lower bearing 70 until it is free of the balance staff. The cam 98 now releases the latching pawl 95 again, and the cycle continues. This sequence follows for each of the unit assemblies on the loading tray, with the individual assemblies presented on the bearings 85, 107 for testing, and then removed therefrom and supported on the tray during their indexing.

When all of the assemblies have been tested, the notch 25 returns opposite the testing point. The operator now releases the top nut 56, removes the tray, and places a fresh tray of untested devices in position.

It will be noted that the machine can be employed with watch balances and similar devices which are of such delicate nature that they must be protected against incautious handling. The employment of the removable tray permits a loading operator to fill the tray by employment of tweezers, and then the tray is transmitted to the testing operator, who has no occasion to manually touch the balance or other device as an incident of bringing it into properly supported position for testing and need only, in the illustrated form of the invention, engage the hair spring of a watch balance in the grippers 108, 108a. When the testing of all devices on the tray has been completed, these devices have been restored to positions on the tray, and the tray can be taken from the testing machine as a unit and thus delivered to the assembling operators who insert the balances or other devices in the mechanisms for which they are intended.

The particular form of tray is of great advantage in such service, as it provides adequate protection to the sensitive parts and yet, by the presence of the notches 23, permits the effective employment of tweezers and normal movements for inserting and removing the individual balances. The notch 25 not only serves as a preliminary guide while setting the tray in position in the testing machine to assure that the locating pin 58 will properly engage in the inner notch 26, but also permits the movement of the tray into position, without interference with or by the upper support member 107 or the lower support member 85 with its winding spring extension 88.

It is obvious that the invention may be employed in other ways within the scope of the appended claims.

I claim:

1. A testing machine for watch balances and like rotatable devices, comprising a rotatable tray having portions for accurately positioning a plurality of the devices and including locating means, a rotatable member for receiving the tray and including an element interengageable with said locating means, a main drive and means for intermittently effecting operation of the same, a cam nest driven positively by said main drive, a frictional drive operated by said main drive and connected to said rotatable member for rotating the same, latching means controlled by the cam nest for detaining said rotatable member in any one of a number of stations each corresponding to presentation of a said device in position for testing, and means controlled by the cam nest while the latching element is in detaining position for causing the device positioned for testing to be freed from the tray preparatory to testing and to be held in such free position during testing and also for causing the device to be restored to the tray prior to the succeeding release of said latch element.

2. A machine as in claim 1, in which the rotatable member includes a rotatable element upon which is mounted said interengageable element, an axially movable element actuated from the cam nest, and means on said axially movable element for supporting said tray for axial movement while engaged with said interengageable element and thereby held in a predetermined relative angular position on the rotatable element.

3. A machine as in claim 1, including a relatively fixed support member for the device, and in which the latter means controlled by the cam nest includes an axially movable table, a support member movable with the table and engageable in its moved position with the device which is positioned for test for thereby moving the same into testing position relative to the fixed support member.

4. A testing machine for watch balances, comprising a tray rotatable about a vertical axis and having portions for accurately positioning a plurality of devices angularly about its periphery, an upper relatively fixed support for receiving the upper end of the balances, a rotatable member for receiving the tray, locating means cooperatively positioned on the tray and on said rotatable member for maintaining a predetermined relative angular position, a main drive and means for intermittently effecting operation of the same, a frictional drive operated by said main drive and connected to said rotatable member for giving the same a rotary indexing movement, a cam nest driven positively by said main drive, latching means controlled by the cam nest for detaining said rotatable member in any one of a number of indexed stations each corresponding to presentation of a said device in position for testing, a movable lower support member, and means controlled by the cam nest for raising the tray and said lower support member in unison and thereby engaging a selected device with the upper support member and thereafter being effective for lowering the tray and thereby freeing the selected device therefrom and leaving the same in position on the upper and lower support members.

5. A machine as in claim 4, in which the said means controlled by the cam nest is effective at the completion of a testing operation for lifting the tray into a position for receiving the device which has been tested, and thereafter being effective for lowering the tray and the lower support in unison and for finally withdrawing the lower support member from the device which has been tested whereby to free the device and tray for an indexing movement of the tray.

6. A testing machine for watch balances, comprising a tray rotatable about a vertical axis and having portions for accurately positioning a plurality of balances, a rotatable member for receiving the tray, interengageable locating elements on the tray and rotatable member for maintaining the same in a predetermined relative angular position, a main drive and means for intermittently effecting operation of the same, a cam nest driven positively by said main drive, a frictional drive operated by said main drive and connected to said rotatable member for rotating the same, latching means controlled by the cam nest for detaining said rotatable member in any one of a number of stations each corresponding to presentation of a said balance in position for testing, a lower support member, means controlled by the cam nest for lifting said lower support member into engagement with a selected balance and bringing the same into position for testing, a rotatable piece having an axially projecting spring element for engaging between spokes of the balance, means for rotating said piece and thereby moving the spring for storing energy in the hair spring of the balance, said piece including a further cam for producing an initial axial movement of the spring into position for engaging the spokes, followed by a return axial movement thereof whereby to release the balance for oscillation upon said support member.

7. A machine as in claim 6, in which the means for rotating said piece includes a gear, a friction member for rotating said gear in one direction, and means included in the structure for preventing a reverse rotation of said piece.

8. A machine as in claim 6, in which the said piece is rotated by a gear, and including a lever connected to a rockable member, said rockable member being engageable for moving said gear in one direction and for returning in the opposite direction without moving the gear, means for limiting the retrograde movement of said rotatable piece, and adjustable stops for determining the arcuate stroke of said rockable member.

9. A machine for handling watch balances and like rotatable devices, comprising a rotatable tray having spaced peripheral portions for accurately positioning a plurality of the devices and including locating means, a rotatable member for receiving the tray and including an element interengageable with said locating means, cyclically operative cam elements and means effective to drive the same in cycle, a member controlled by the cam elements and effective to interrupt the driving of said cam elements upon completion of a cycle, latching means actuated by the cam elements for detaining said rotatable member in any one of a number of stations each corresponding to presentation of a said peripheral portion in a predetermined position with a device therein, means controlled by the cam nest effective while the latching means is in detaining position for causing the presented device to be removed from the tray, and means effective for initiating a cyclic movement of the cam elements, said cam elements being effective also to cause the device to be restored to the tray prior to the succeeding release of said latching means.

10. A removable indexable tray for a testing machine for watch balances, comprising a plate having a central aperture by which the same may be mounted for indexing movement in the testing machine, said plate having a plurality of equi-distant pockets each adapted to receive and maintain the position of a watch balance, each of the pockets having associated therewith a notch extending to the periphery of the tray for the passage of tweezers employed in positioning and removing the balance therefrom, a further notch being provided in the tray for reception of a locating member of said machine for determining the angular position of the tray therein.

11. A removable indexable tray for a testing machine for watch balances, comprising a plate having a central aperture by which the same may be mounted on an indexing shaft of the testing machine, said plate having adjacent its periphery a plurality of equi-distant openings extending through the plate and providing pockets at one face each adapted to receive a watch balance, said openings each affording access from the other face of the plate for balance-holding means in the testing machine effective to remove a positioned balance from its pocket at the said one face, a notch being provided in the periphery of the tray for reception of a locating member carried in rotation with the indexing shaft for determining the angular position of the tray in said testing machine.

12. An indexable tray for a testing machine for watch balances, comprising a circular body having means for angularly-located and concentric attachment to the machine, said body having a plurality of equi-distant concentrically-arranged pockets, each pocket having a shoulder below the upper surface of the body for receiving the rim of the corresponding balance wheel, and each pocket having a wall upstanding above the shoulder means a distance greater than the thickness of the balance rim, and a plurality of locating devices at each pocket for engaging a periphery of the corresponding balance wheel and maintaining the same in a predetermined position for accurate concentric presentation to the testing machine.

13. An indexable tray as in claim 12 in which the locating devices are pins having tapered upper ends terminating below the top of the pocket.

WALTER KOHLHAGEN.

REFERENCES CITED

The following references are of record in the file of this patent:

UNITED STATES PATENTS

| Number | Name | Date |
|---|---|---|
| 1,319,740 | Wickstrom | Oct. 28, 1919 |
| 1,547,733 | Chamberlain | July 28, 1925 |
| 1,648,660 | Peters | Nov. 8, 1927 |
| 2,300,361 | Reynolds | Oct. 27, 1942 |
| 2,321,548 | Hanneman | June 8, 1943 |
| 2,355,092 | Meister | Aug. 8, 1944 |
| 2,358,078 | Kohlhagen | Sept. 12, 1944 |
| 2,393,246 | Hallowell | Jan. 22, 1946 |